June 3, 1941.  W. A. PATTON  2,244,212
UNLOADING VALVE MECHANISM
Filed Jan. 12, 1939
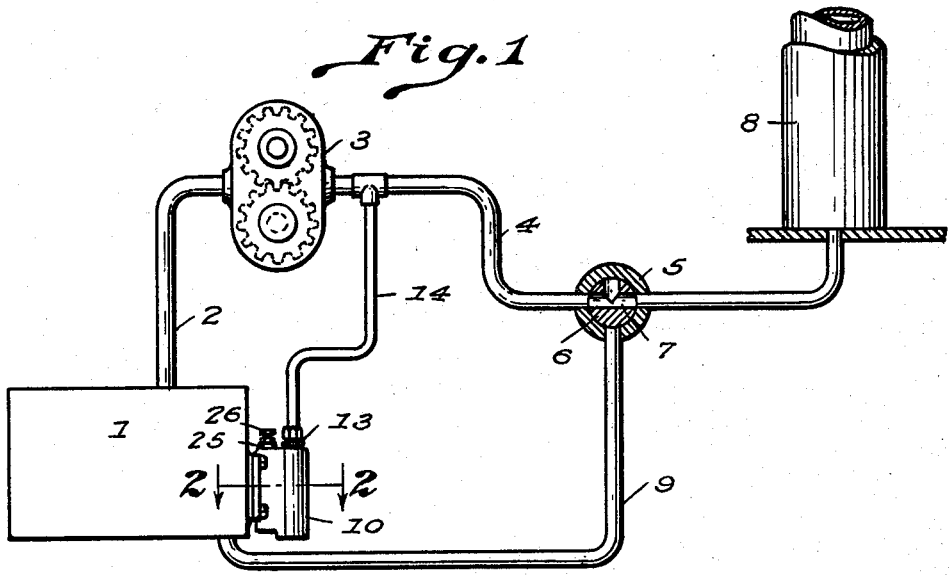
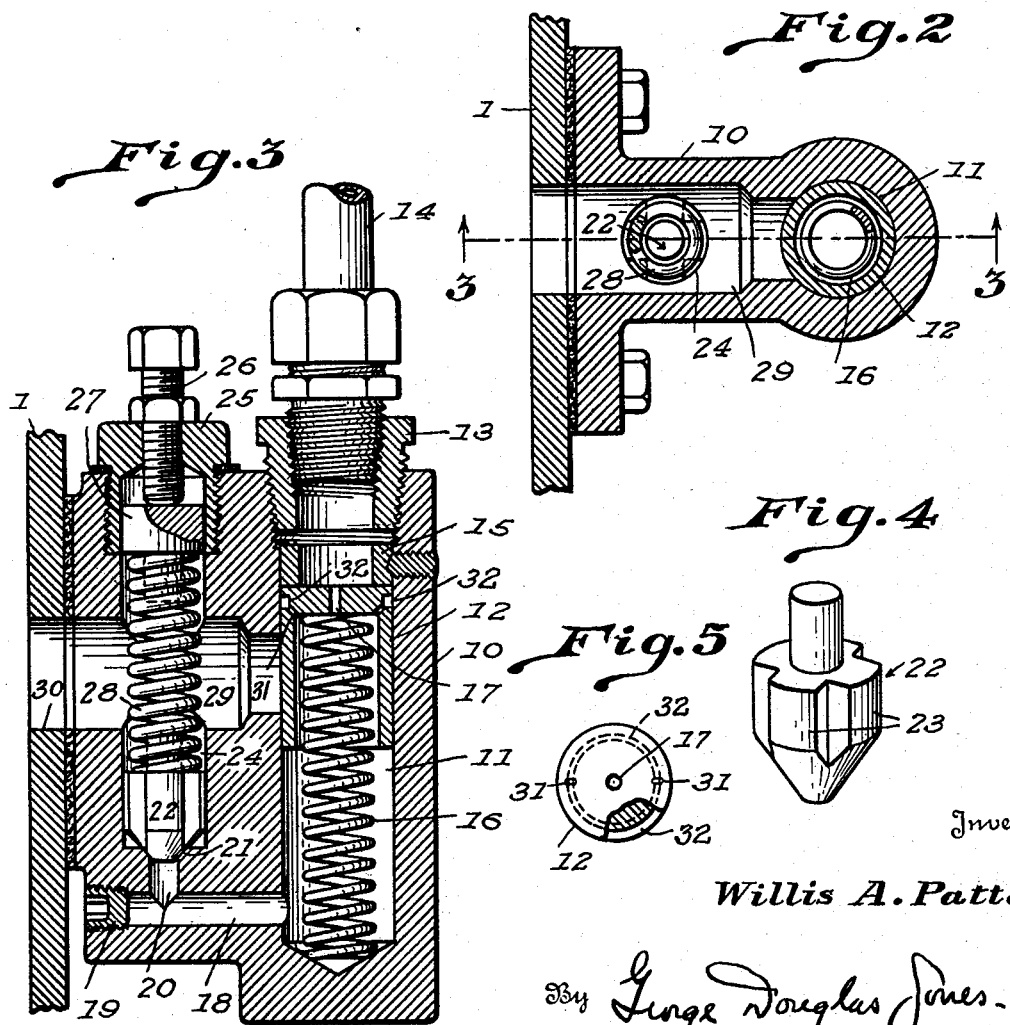
Inventor
Willis A. Patton
By George Douglas Jones
Attorney Patented June 3, 1941

2,244,212

UNITED STATES PATENT OFFICE 2,244,212

UNLOADING VALVE MECHANISM

Willis A. Patton, Cleveland, Ohio, assignor to Hydraulic Control Engineering Company, Cleveland, Ohio Application January 12, 1939, Serial No. 250,658

3 Claims. (Cl. 137—53)

This invention relates to an improved unloading valve mechanism and has for its primary object the provision of an unloading valve mechanism which is adapted to be employed in connection with a fluid pressure system for the purpose of relieving such a system automatically of abnormally high pressures after a predetermined pressure has been reached.

Pressure relief mechanisms heretofore employed in systems in which a liquid is pumped under pressure to perform work, have usually included loaded valves which open after a predetermined pressure setting has been reached to provide for a restricted and high velocity discharge of jets of oil or other liquid used in the system in obtaining pressure reduction. When oil is used in such a hydraulic system, its release through an ordinary spring loaded valve under high pressure and in a restricted stream results in the heating of the oil and loss of its desired viscosity characteristics and, therefore, it is an object of the present invention to provide an unloading valve which, when it automaticaly opens to relieve abnormal pressure conditions, will enable the by-pass fluid to be returned to a source of supply under low or negligible pressures, so that the cutting or the heating of the oil will be avoided and the desired properties of the fluid retained.

It is another object of the invention to provide an unloading valve mechanism which is formed to include a housing having a chamber disposed therein in which is slidably mounted a pressure balanced plunger, one end of the chamber being connected with a high pressure fluid system and the other end of the chamber, on the opposite side of said plunger, being connected with a source of fluid supply, the said housing further including a spring loaded pilot relief valve which upon opening in response to high pressures effects a pressure differential on the opposite ends of said plunger so that the latter will be moved in said chamber from its normal position to a position uncovering an enlarged port which leads from said chamber to the source of liquid supply, whereby by-pass fluid from the high pressure system may be returned to the source of supply under a low or negligible pressure and without injury to the liquid contained in the system.

With these and other objects in view, which will appear as the description proceeds, the invention consists in the novel features of construction, combination of elements and arrangements of parts hereinafter fully described and pointed out in the appended claims.

In the accompanying drawing,

Fig. 1 is a diagrammatic view of a hydraulic pressure system provided with the unloading valve mechanism comprising the present invention;

Fig. 2 is a horizontal sectional view taken through the unloading valve mechanism on the plane indicated by the line 2—2 of Fig. 1;

Fig. 3 is a vertical sectional view taken through the unloading valve mechanism on the plane indicated by the line 3—3 of Fig. 2;

Fig. 4 is a detail perspective view of the pilot relief valve member;

Fig. 5 is a plan view partly in section of the pilot relief valve.

Referring more particularly to the drawing, the numeral 1 designates a receptacle for the retention of liquid and comprises a source of liquid supply. Leading from the receptacle or tank 1 is a low pressure pipe line 2 which extends to the inlet or suction side of a suitable pump 3. The discharge or high pressure side of the pump communicates with a high pressure pipe line 4 in which is located a three-way control valve 5. The pipe line 4 extends to a suitable instrumentality which is adapted to be operated by the employment of liquid under pressure such, for example, as a hydraulic hoist, jack, or elevator. The control valve 5 includes a rotatable plug 6 having T-shaped ports 7. The ports are arranged as disclosed in Fig. 1 and liquid may be advanced under pressure from the pump 3, through the line 4, thence through the control valve 5 to the bottom of the hoisting mechanism indicated at 8. In the second position of the control valve, the flow of liquid to the hoisting mechanism may be interrupted and the liquid returned from the high pressure side of the pump to the tank 1 by way of the return pipe line 9. A third position of the control valve provides for the return of liquid from the hoisting mechanism to the tank or receptacle 1 by way of the pipe lines 4 and 9.

In the event that abnormally high pressures exist in the system connected with the discharge side of the pump 3 such, for instance, as when the pump is overloaded, or when the ram of the hoisting mechanism 8 reaches an extreme position, the present invention provides an improved unloading valve mechanism for rapidly relieving the system of abnormally high pressures when a predetermined maximum pressure has been reached.

This unloading valve mechanism, which includes a housing 10, is, in the form of the invention illustrated, directly carried by one of the side walls of the tank or receptacle 1. The housing is formed to include a plunger chamber 11 in which is mounted a slidable plunger 12 which has a sliding fit with the walls of the chamber 11. The upper end of said chamber is provided with a threaded fitting 13 to which is secured the lower end of a by-pass line 14, the latter having its upper end connected with the high pressure line 4 at a point between the pump 3 and the control valve 5. Also, the chamber 11 is provided with a fixed ring 15 which limits upward travel of the plunger 12, and a spring 16 is arranged in the lower part of said chamber between the under side of the plunger 12 and the bottom of said chamber, the said spring serving, when substantially equal pressures exist on opposite sides of said plunger, to maintain the latter in contact with the ring 15. In this instance, the plunger is provided with an axial or longitudinal bore or passage 17 of restricted cross sectional area so that liquid under pressure may be transferred from the upper portion of said chamber to the lower portion thereof and thereby exert balanced fluid pressures on both ends of the plunger when the latter occupies its normal position.

Communicating with the lower portion of the chamber 11 is a perpendicularly arranged passage 18 closed at its other end by means of a threaded plug 19. The passage 18 is provided with an upwardly extending branch 20 which terminates in a seat 21 with which is normally engaged a pilot relief valve member 22, the latter, as shown in Fig. 4, being provided with radial ribs 23 which slidably engage with the walls of a vertical bore 24 provided in the housing 10 adjacent to and in parallel relationship with the chamber 11. The upper end of the bore 24 is closed by means of a threaded cap 25 which carries an adjusting screw 26. The stem of the screw 26 engages with a washer 27, and confined between the washer 27 and the body of the pilot relief valve 22 is a loading spring 28, which normally functions to maintain the relief valve member in its closed position, preventing the passage of liquid from the chamber 11 into the bore 24. In this instance, the bore 24 is intercepted by a port or conduit 29, which is arranged at right angles to the axis of the chamber 11, and the inlet end of the conduit 29 is disposed so that it is in registration with the plunger 12 when the latter is normally positioned, as disclosed in Fig. 3, so that under such normal conditions, there will be no flow of liquid from the high pressure by-pass line 14 into the conduit 29. The other end of the conduit 29 terminates in registration with an opening 30 formed in one of the side walls of the receptacle 1 so that when the plunger is unbalanced by a pressure differential on the opposite ends thereof, the said plunger will be moved to uncover the inlet end of the conduit 29 and to permit of the direct passage of liquid from the discharge side of the pump, through the passageway comprising by-pass line 14, the chamber 11 and the conduit 29 directly into the tank.

It will be observed in Figs. 3 and 5 that the plunger 12 has in its upper end a pair of relatively small conduits 31, 31 which extend upwardly and outwardly through the side wall of said plunger 12, and communicate with an annular groove or recess 32 in the outer surface and adjacent the upper end of said plunger 12. The peripheral groove or recess 32 serves as a header connection for the conduits 31, 31.

In the use of the system, the control 5 may be suitably actuated, as shown in Fig. 1, so that liquid under suitable pressure will pass through the pipe line 4 from the discharge side of the pump to the jack or hoisting mechanism 8. The valve 5 may also be suitably operated to short circuit the hoisting mechanism and to provide for the circulation of fluid from the pipe line 4, through the valve 5 and thence through the pipe line 9 to the tank 1. Again, the valve 5 may be positioned to provide for the drainage of fluid from the hoisting mechanism by passage through the pipe line 4, the valve 5 and the pipe line 9 to the tank. It will be assumed, however, that the valve 5 is actively positioned, as disclosed in Fig. 1, and the pump 3 operating to advance liquid under pressure through the pipe line 4 to operate the hoisting mechanism. Then, when normal pressures obtain, the pilot relief valve 22, which is adjustably loaded by the spring 28 and the screw 26, is maintained in a position of closure which enables the fluid pressures on the opposite sides of the plunger to be substantially equalized, the plunger then being maintained in its upper or normal position, as shown in Fig. 3, by the action of the spring 16 or its equivalent. This position of the unloading valve is retained when the system is subjected to normal operating pressures. In the event these pressures should exceed a predetermined value, the same will be applied to the pilot relief valve 22 which will open against the pressure of the spring 28.

Since the bore 17 in the plunger 12 is of restricted diameter, as compared with the diameter of the chamber 11 or the auxiliary passage 18, the opening of the pilot relief valve provides for the release of fluid pressure below the plunger. This ordinarily causes the plunger to move downwardly by reason of the fluid pressure exerted on the upper end thereof and the volumetric flow of the fluid so that the plunger is depressed to a position uncovering the conduit 29. Since this conduit is of comparatively large diameter, fluid flow therethrough takes place without appreciable resistance and, therefore, the pressure on the system is immediately reduced to a very substantial degree without unduly heating the oil or causing loss of its viscosity, as so frequently occurs in relief valve mechanisms of the prior art. When the pressures have been thus reduced, the relief valve mechanism closes and normal operating conditions are then restored.

While it is obvious that abnormal pressure in the system will be limited to a predetermined value by the adjustably loaded pilot relief valve 22, it should be pointed out that the plunger or major by-pass valve 12 will move to open the by-pass conduit 29 only when the total energy of fluid flow against its upper side, as viewed in Fig. 3, is sufficient. Otherwise, a slow leakage of fluid by the pilot relief valve 22 will reduce the system pressure without permitting by-pass valve 12 to open.

From what has been said, it will be understood that a discharge through pilot relief valve 22 is necessary to initiate movement of plunger 12 from the closed position of Fig. 3. After plunger 12 has moved downwardly far enough to connect its header groove 32 with the right-hand extremity of by-pass conduit 29, oil under pressure below plunger 12 can escape through the conduits 31, 31. This escape of pressure fluid does not oppose the high pressure stream acting on the top end of plunger 12 or the pressure force tending to seat the pilot relief valve 22. The beneficial result which inheres in such an arrangement of valve mechanism parts is to aid in reducing the force opposing establishment of low pressure discharge directly through conduit 29, and to minimize the time required for completion of the opening movement of plunger 12.

What I claim is:

1. An unloading valve mechanism for hydraulic pressure systems comprising, in combination, a housing having a plunger chamber formed therein, one end of said chamber being adapted for connection with a high pressure line and the other end leading to a fluid exhaust passage; a discharge conduit intermediate the chamber; plunger means reciprocable within said chamber, said plunger means having a longitudinal passage extending therethrough provided with a restricted portion and a lateral conduit therethrough in communication with said longitudinal passage and arranged to communicate directly with the discharge conduit of the housing before said conduit is opened by the plunger; means for normally maintaining said plunger in a position which closes said discharge conduit and lateral conduit of the plunger; and valve means operable in response to abnormal pressure in the high pressure line and the end of the chamber leading to the fluid exhaust passage to produce an unbalanced pressure on the plunger and allow it to move to a position which opens said discharge conduit and permits the high pressure line to discharge freely therein.

2. An unloading valve mechanism for hydraulic pressure systems comprising, in combination, a housing having a chamber formed therein, one end of said chamber being adapted for connection with a high pressure line and the other end leading to a fluid exhaust passage; a discharge conduit intermediate the chamber; plunger means reciprocable within said chamber, said plunger means having a longitudinal passage extending therethrough provided with a restricted portion and upwardly extending lateral conduits therethrough in communication with said longitudinal passage and connected by an annular peripheral groove arranged to communicate directly with the discharge conduit of the housing before said conduit is opened by the plunger; means for normally maintaining said plunger in a position which closes said discharge conduit and lateral conduit groove of the plunger; and spring-controlled valve means operable in response to abnormal pressure in the high pressure line and the end of the chamber leading to the fluid exhaust passage to produce an unbalanced pressure on the plunger and allow it to move to a position which opens said discharge conduit and permits the high pressure line to discharge freely therein.

3. An unloading valve mechanism for hydraulic pressure systems comprising, in combination, housing means having a plunger chamber formed therein, one end of said chamber being adapted for connection with a high pressure line and the other end leading to a fluid exhaust passage; a discharge conduit intermediate the ends of the chamber; plunger means reciprocable within said chamber, said plunger means having a lateral conduit therethrough arranged to connect the chamber space defined by the plunger end adjacent the fluid exhaust passage directly with the discharge conduit of the housing means before said conduit is opened by the plunger means, and one of the previously recited means being provided with a passage arranged always to expose both ends of the plunger means to fluid from the high pressure line; resilient means for normally maintaining such plunger means in a position which closes said discharge conduit and lateral conduit of the plunger means; and valve means operable in response to abnormal pressure in the end of the chamber leading to the fluid exhaust passage to produce an unbalanced pressure on the plunger means and allow said plunger means to move to a position which opens said discharge conduit and permits the high pressure line to discharge freely therein.

WILLIS A. PATTON.